United States Patent
Yano et al.

(10) Patent No.: US 6,920,278 B1
(45) Date of Patent: *Jul. 19, 2005

(54) RECORDING/REPRODUCTION APPARATUS AND RECORDING/REPRODUCTION METHOD

(75) Inventors: Hajime Yano, Kanagawa (JP); Hiroaki Oishi, Tokyo (JP); Toyomi Fujino, Kanagawa (JP)

(73) Assignee: Sony Corporation, Tokyo (JP)

( * ) Notice: Subject to any disclaimer, the term of this patent is extended or adjusted under 35 U.S.C. 154(b) by 933 days.

This patent is subject to a terminal disclaimer.

(21) Appl. No.: 09/655,231

(22) Filed: Sep. 5, 2000

(30) Foreign Application Priority Data

Sep. 6, 1999 (JP) .......................................... 11-252326
Apr. 28, 2000 (JP) ...................................... 2000-134307

(51) Int. Cl.[7] .................................................. H04N 5/91
(52) U.S. Cl. .............................. 386/94; 386/83; 386/93
(58) Field of Search ............................. 386/94–95, 83, 386/46; 345/721; 360/15; 710/38; 725/46, 86, 87, 101–102, 38–40, 47; 348/721

(56) References Cited

U.S. PATENT DOCUMENTS 5,325,238 A * 6/1994 Stebbings et al. ............. 360/15
6,085,262 A * 7/2000 Sawada ......................... 710/38
6,324,338 B1 * 11/2001 Wood et al. ................... 386/83
6,581,207 B1 * 6/2003 Sumita et al. ................. 725/46
6,636,688 B1 * 10/2003 Otana ............................ 386/83
6,642,939 B1 * 11/2003 Vallone et al. ............... 345/721

FOREIGN PATENT DOCUMENTS

WO    WO92/22983    * 12/1992    .......... H04N/5/781

* cited by examiner

*Primary Examiner*—Robert Chevalier
*Assistant Examiner*—Jamie Vent
(74) *Attorney, Agent, or Firm*—Frommer Lawrence & Haug LLP; William S. Frommer

(57) ABSTRACT

A recording/reproduction apparatus and a recording/reproduction method are adapted to information on the recording area of a recording medium without intervention of the operator if the recording medium is short of capacity necessary for recording the information to be recorded. If information not recorded on a magnetic tape is supplied to DTR 9 and central control section 2 determines that the magnetic tape does not have a recording capacity sufficient for recording the information, the central control section 2 causes the DTR 9 to record said information not recorded on the magnetic tape in the storage area of the magnetic tape storing one or more than one pieces of information with the oldest time and date of recording.

14 Claims, 8 Drawing Sheets

RECORDING/REPRODUCTION APPARATUS AND RECORDING/REPRODUCTION METHOD

BACKGROUND OF THE INVENTION

1. Field of the Invention

This invention relates to a recording/reproduction apparatus and also to a recording/reproduction method for recording and reproducing information by using a recording apparatus adapted to store a large volume of data such as a video tape recorder or a video disk recorder.

2. Related Background Art

Video tape recorders (hereinafter to be referred to as VTRs) using as recording medium a magnetic tape that has a large memory capacity and is available at low cost and video disk recorders using as recording medium an optical disk or an HDD are among currently highly popular recording/reproduction apparatus adapted to continuously record/reproduce video/audio data such as a large number of programs over a long period of time. With such recording/reproduction apparatus as VTRs, it is user's sole operation to record the supplied programs sequentially on the recording medium and select the program(s) to be erased in order to secure a required recording area on the recording medium if the recording medium is short of capacity for recording additional program(s) to be recorded.

However, the operation of selecting programs to be erased out of a large number of programs recorded on the recording medium is a rather cumbersome one to the user. Additionally, the recording algorithm is normally very complicated and the file structure of the recorded video/audio data is often fragmental when the programs selected by the user are erased from the recording medium and video/audio data are recorded continuously on recording area secured on the recording medium by erasing the selected programs due to various factors including the discontinuity of the recording area produced when a programs with different durations are recorded on the recording medium and the low search speed of the VTR that arises when the recording medium is made very long or large to provide a large recording capacity.

In view of the above identified circumstances, it is therefore the object of the present invention to provide a recording/reproduction apparatus and a recording/reproduction method adapted to record information on the recording area of a recording medium without intervention of the operator if the recording medium is short of capacity necessary for recording the information to be recorded.

BRIEF SUMMARY OF THE INVENTION

According to the invention, the above object is achieved by providing a recording/reproduction apparatus comprising:

a first information recording means for recording proper information to be recorded including information on the time and date of recording on a first recording medium from the recording starting point of said first recording medium in the order of time and date of recording;

a recording capacity determining means for judging if said first recording medium has a remaining recording capacity sufficient for recording said information to be recorded;

an oldest information detecting means for detecting one or more than one a pieces of information having the oldest time and date of recording out of the plurality of pieces of information recorded on said first recording medium;

a recording control means for controlling the operation of recording information not recorded on said first recording medium in the recording area of said first recording medium storing said one or more than one pieces of information having the oldest time and date of recording as detected by said oldest information detecting means if the information not recorded on said first recording medium is supplied and said recording capacity determining means judges that said recording medium does not have said remaining recording capacity.

With a recording/reproduction apparatus according to the invention and having the above described configuration, information not recorded on the first recording medium is recorded in the recording area of the first recording medium storing one or more than one pieces of information having the oldest time and date of recording as detected by said oldest information detecting means if the information not recorded on the first recording medium is supplied and the recording capacity determining means judges that the recording medium does not have the remaining recording capacity.

In another aspect of the present invention, there is provided a recording/reproduction method comprising:

a first information recording step of recording proper information to be recorded including information on the time and date of recording on a first recording medium from the recording starting point of said first recording medium in the order of time and date of recording;

a recording capacity determining step of judging if said first recording medium has a remaining recording capacity sufficient for recording said information to be recorded;

an oldest information detecting step of detecting one or more than one pieces of information having the oldest time and date of recording out of the plurality of pieces of information recorded on said first recording medium; and a recording updating step of recording information not recorded on said first recording medium in the recording area of said first recording medium storing said one or more than one pieces of information having the oldest time and date of recording as detected in said oldest information detecting step if the information not recorded on said first recording medium is supplied and it is judged in said recording capacity determining step that said recording medium does not have said remaining recording capacity.

With a recording/reproduction method according to the invention and comprising the above described steps, information not recorded on the first recording medium is recorded in the recording area of the first recording medium storing one or more than one pieces of information having the oldest time and date of recording as detected in said oldest information detecting step if the information not recorded on the first recording medium is supplied and the recording capacity determining means judges that the recording medium a does not have the remaining recording capacity.

Thus, with a recording/reproduction apparatus and a recording/reproduction method according to the invention, the new information to be recorded on a recording medium not having a remaining recording capacity sufficient for recording the information is recorded in the recording area of the recording medium storing one or more than one pieces of information having the oldest time and date of recording without requiring the user to specify the recording area for recording the information to be recorded on the recording medium. Thus, the operator is relieved of the cumbersome recording area specifying operation to improve the efficiency of the overall recording operation.

Additionally, with a recording/reproduction apparatus and a recording/reproduction method according to the invention, the efficiency of operation of the user interface is improved because the operator is relieved of the cumbersome operation of specifying one or more than one areas where the recorded data are prohibited from being erased.

Still additionally, with a recording/reproduction apparatus and a recording/reproduction method according to the invention, the recording algorithm can be simplified because pieces of information are recorded continuously on the recording medium in the order of time and date of recording.

Furthermore, with a recording/reproduction apparatus and a recording/reproduction method according to the invention, the information to be recorded on the recording medium is prevented from being fragmented so that the entire information recording/reproducing operation can be greatly simplified.

Finally, with a recording/reproduction apparatus and a recording/reproduction method according to the invention, the time required for searching for the target position on the recording medium can be minimized as a result of simplified information recording/reproducing operation.

DETAILED DESCRIPTION OF THE INVENTION

Now, the present invention will be described in greater detail by referring to the accompanying drawings that illustrate a preferred embodiment of the invention.

Figure 1:
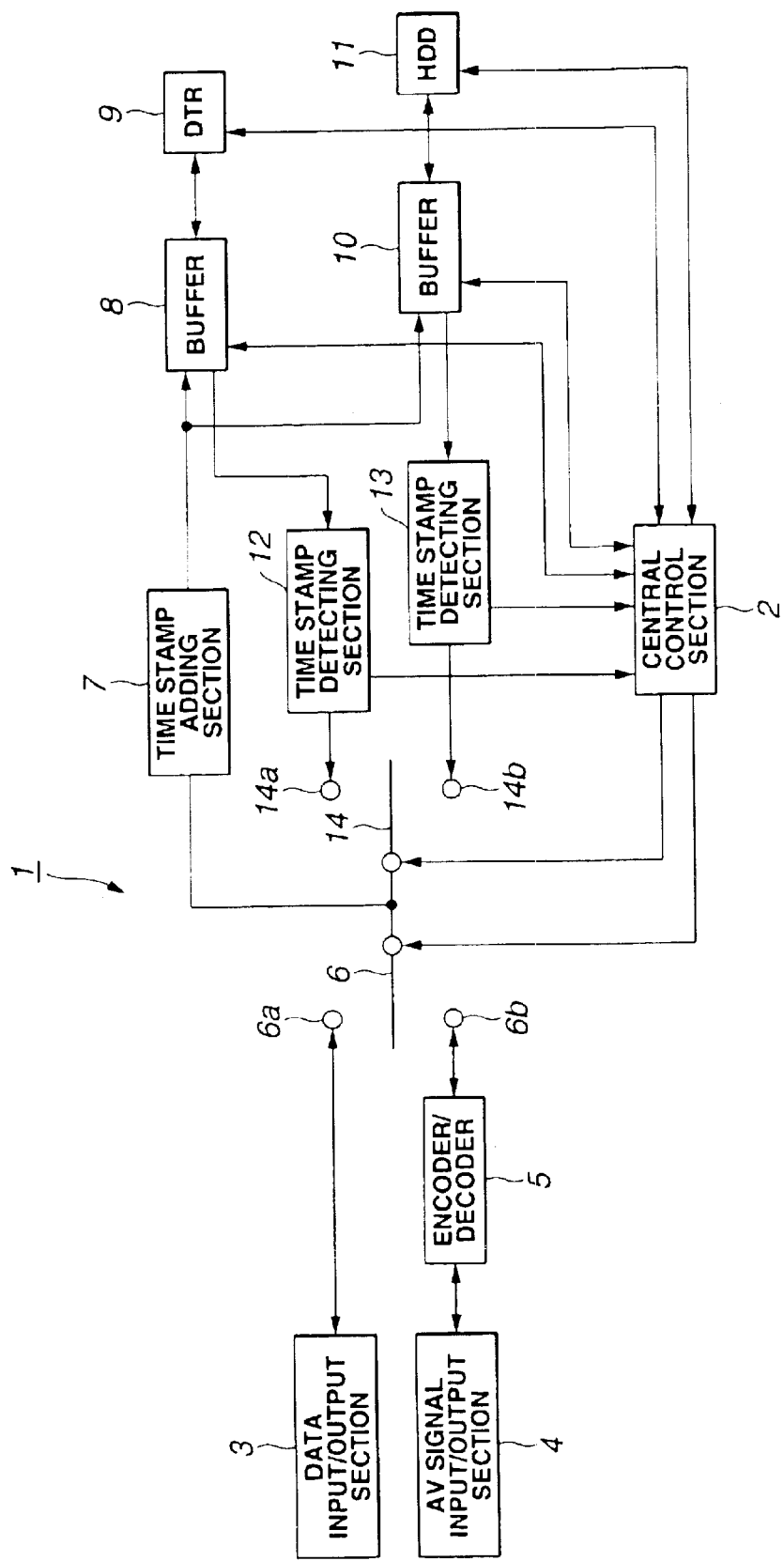
FIG. 1 is a schematic block diagram of a recording/reproduction apparatus according to the invention.

FIG. 1 is a schematic block diagram of the embodiment of recording/reproduction apparatus according to the invention.

Referring to FIG. 1, the recording/reproduction apparatus 1 comprises a central control section 2, a data input/output section 3, a video/audio signal (hereinafter to be referred to as AV signal) input/output section 4, an encoder/decoder section 5, an input/output information changeover switch section 6, a time stamp adding section 7, a buffer memory 8, a data tape recorder (hereinafter to be referred to as DTR) 9, a buffer memory 10, a hard disk drive (hereinafter to be referred to as HDD) 11, a time stamp detecting section 12, a time stamp detecting section 13 and a synchronization changeover switch section 14.

The central control section 2 is typically a CPU (central processing unit) adapted to read a program for controlling related circuits from a memory (not shown) and performs control operations according to the program it reads.

More specifically, the central control section 2 starts operating at the time when the recording/reproduction 1 is made to start operating and supplies control information for operating the switch of the input/output information changeover switch section 6 (hereinafter to be referred to as information changeover control information) according to the type of information supplied to the input/output information changeover switch section 6.

For instance, if the input/output information changeover switch section 6 is fed with date from the data input/output section 3, the central control section 2 supplies information changeover control information for turning the switch of the input/output information changeover switch section 6 to the terminal 6a at the side of the data input/output section 3 to the input/output information changeover switch section 6. If, on the other band, the input/output information changeover switch section 6 is fed with an AV signal from the AV signal input/output section 4 by way of the encoder/decoder section 5, the central control section 2 supplies information changeover control information for turning the switch of the input/output information changeover switch section 6 to the terminal 6b at the side of the AV signal input/output section 4 to the input/output information changeover switch section 6.

If the input/output information changeover switch section 6 is fed with data from the synchronization changeover switch section 14, the central control section 2 supplies information changeover control information for turning the switch of the input/output information changeover switch section 6 to the terminal 6a to the input/output information changeover switch section 6. If, on the other hand, the input/output information changeover switch section 6 is fed with an AV signal from the synchronization changeover switch section 14, the central control section 2 supplies information changeover control Ad information for turning the switch of the input/output information changeover switch section 6 to the terminal 6b to the input/output information changeover switch section 6.

Additionally, the central control section 2 judges the ratio of dividing the data or the AV signal fed to the buffer memory 8 and the buffer memory 10 from the data input/output section 3 or the AV signal input/output section 4, whichever appropriate, and allocating the pieces of information produced by the division of information to the DTR 9 and the HDD 11 and supplies the control information telling the outcome of the judgment (hereinafter to be referred to as division/allocation control information) to the buffer memory 8 and the buffer memory 10.

For instance, if a program including time stamp information is fed to the buffer memory 8 and the buffer memory 10 from the time stamp adding section 7, the central control section 2 supplies division/allocation control information to the buffer memory 8 and the buffer memory 10 so as cause the HDD 11 to store the information (hereinafter to be referred to as access information) for a reproduction time longer than the maximum time necessary for the DTR 9 to access the specified program on the magnetic tape when the control information (hereinafter to be referred to as specified program reproduction control information) for controlling the reproduction of the program (hereinafter to be referred to as specified program) input and specified by the user on the magnetic disk and cause the DTR 9 to store the information for the remaining reproduction time on the magnetic tape.

Then, the buffer memory 10 supplies the access information on the basis of the division/allocation control information fed from the central control section 2 to the HDD 11 in order to cause the latter to store it on the magnetic disk. On the other hand, the buffer memory 8 supplies the information (hereinafter to be referred to as post-access information) for the remaining reproduction time after said access information to the DTR 9 on the basis of the division/allocation control information fed from the central control section 2 in order to cause the DTR 9 to store it on the magnetic tape.

Thus, the central control section 2 supplies division/ allocation control information to the buffer memory 8 and the buffer memory 10 each time the buffer memory 8 and the buffer memory 10 are fed with a program including time stamp information from the time stamp adding section 7. In this way, access information is stored on the magnetic disk for a plurality of programs and post-access information is stored on the magnetic tape also for a plurality of programs.

The access information stored in the magnetic disk and the post-access information stored in the magnetic tape of each program may contain a same piece of information for an overlapping part so that the program portion in reproduced from the magnetic disk and the program portion reproduced from tin the magnetic tape may be linked together seamlessly. Furthermore, while the DTR 9 does not store the access information that is stored on the magnetic disk on the magnetic tape, it may alternatively be so arranged that the access information is also stored on the magnetic tape. Then, all the information on the entire program is stored on the magnetic tape from the very beginning of the program. Note that the quantity of the access information is greater than the quantity of information for the time required by the magnetic head of the DTR 9 to search for the top position on the magnetic tape from which the supplied program is to be recorded.

Additionally, the central control section 2 causes the buffer memory 8 to supply the program fed from the time stamp adding section 7 and stored temporarily in it to the DTR 9 and supplies the control information (hereinafter to be referred to as tape recording control information) necessary for causing the DTR 9 to store the program fed from the buffer memory 8 on the magnetic tape to the buffer memory 8 and the DTR 9. More specifically, the central control section 2 causes the buffer memory 8 to supply the program continuously fed from the time stamp adding section 7 and stored temporarily in it to the DTR 9 by supplying the tape recording control information to the buffer memory 8. At the same time, the central control section 2 causes the DTR 9 to record the program fed from the buffer memory 8 on the magnetic tape by supplying the tape recording control information to the DTR 9.

The central control section 2 causes the buffer memory 10 to supply the program fed from the time stamp adding section 7 and stored temporarily in it to the HDD 11 and supplies the control information (hereinafter to be referred to as disk recording control information) necessary for causing the HDD 11 to store the program fed from the buffer memory 8 on the magnetic disk to the buffer memory 10 and the HDD 11. More specifically, the central control section 2 causes the buffer memory 10 to supply the program continuously fed from the time stamp adding section 7 and stored temporarily in it to the HDD 11 by supplying the disk recording control information to the buffer memory 10. At the same time, the central control section 2 causes the HDD 11 to record the program fed from the buffer memory 10 on the magnetic disk by supplying the disk recording control information to the HDD 11.

When the DTR 9 stores the program fed from the buffer memory 8 on the magnetic tape and the recording magnetic head of the DTR 9 is not at the expected position on the magnetic tape for recording the supplied program, the central control section 2 supplies the control information (hereinafter to be referred to as top-searching control information) for causing the DTR 9 to search for the top position on the magnetic tape from which the supplied program is to be recorded to the DTR 9. Then, the DTR 9 searches for the top position on the magnetic tape from which the supplied program is to be recorded on the basis of the supplied top-searching control information. At the same time, the central control section 2 supplies the disk recording control information for causing the HDD 11 to record the access information of said program fed from the buffer memory 10 to the HDD 11. Then, the HDD 11 records the access information of said program on the magnetic disk on the basis of the supplied disk recording control information.

While the central control section 2 causes the buffer memory 10 or the HDD 11 to store or record the program fed from the time stamp adding section 7 in the above description, it may alternatively have either of them to store or record the reproduced from the magnetic tape by the DTR 9.

Additionally, when the specified program reproduction control information is supplied, the central control section 2 makes the HDD 11 instantaneously reproduce the access information of the specified program recorded on the magnetic disk from the same magnetic disk and supply the reproduced access information (hereinafter to be referred to as disk-reproduced access information) to the buffer memory 10 and then supplies both the HDD 11 and the buffer memory 10 with the control information (hereinafter to be referred to as disk reproduction control information) for causing the buffer memory 10 to supply the time stamp detecting section 13 with the disk: reproduced access information fed from the HDD 11.

More specifically, the central control section 2 makes the HDD 11 reproduce the access information of the specified program reproduced from the magnetic disk and supply the reproduced disk-reproduced access information to the buffer memory 10 by supplying the HDD 11 with the disk reproduction control information on the basis of the time stamp information fed from the time stamp detecting section 13 so as to secure the time interval same as the one used by the HDD 11 when the program is recorded on the magnetic disk. Then, the central control section 2 causes the buffer memory 10 to continuously supply the time stamp detecting section 13 with the disk-reproduced access information fed from the HDD 11 by supplying the disk reproduction control information to the buffer memory 10. Then, almost at the same time, the central control section 2 supplies the control information (hereinafter to be referred to as search start control information) for causing a search of the specified program on the magnetic tape to start to the DTR 9 in order to have the latter reproduce the post-access information recorded on the magnetic tape from the same magnetic tape.

The central control section 2 also causes the information (hereinafter referred to as non-output information) stored in the buffer memory 8 on the predetermined program that is reproduced from the magnetic tape by the DTR 9 but not supplied to the time stamp detecting section 12 yet and hence not output to the data input/output section 3 or the AV signal input/output section 4 to be obtained from the buffer memory 8 by way of the buffer memory 10 and recorded on the magnetic disk.

Additionally, the central control section 2 causes the HDD 11 to supply the access information of the specified program reproduced from said magnetic tape to the buffer memory 10 and makes the buffer memory 10 continuously supply the time stamp detecting section 13 with the access information of the specified program fed from the HDD 11, while it supplies almost simultaneously the control information (hereinafter to be referred to as reproduction/recording control information) for causing the HDD 11 to record said non-output information on the magnetic disk. While the central control section 2 makes the buffer memory 10 continuously supply the access information to the time stamp detecting section 13, causing almost simultaneously the HDD 11 to record the non-output information on the magnetic disk in the above description, it may alternatively causes the HDD 11 to record the non-output information on the magnetic disk not simultaneously but on the time division basis if the recording is completed by the time when the HDD 11 terminates the operation of reproducing the access information from the magnetic disk.

When the search for the specified program is over on the magnetic tape, the central control section 2 subsequently causes the DTR 9 to reproduce the post-access information from the position on the magnetic tape obtained by the search and supply the reproduced post-access information (hereinafter to be referred to as tape-reproduced post-access information) to the buffer memory 8 and supplies the DTR 9 and the buffer memory 8 with the control information (hereinafter to be referred to as tape reproduction control information) for causing the buffer memory 8 to supply the time stamp detecting section 12 with the tape-reproduced post-access information fed from the DTR 9.

More specifically, when the operation of searching for the specified program is over on the magnetic tape, the central control section 2 causes the DTR 9 to reproduce the tape-reproduced post-access information from the magnetic tape and supply the obtained tape-reproduced post-access information to the buffer memory 8 by supplying the tape reproduction control information to the DTR 9 so as to secure the time interval same as the one used by the DTR 9 when the program is recorded on the magnetic tape on the basis of the time stamp information fed from the time stamp detecting section 12. Then, the central control section 2 causes the buffer memory 8 to continuously supply the time stamp detecting section 12 with the tape-reproduced post-access information fed from the DTR 9 by supplying the buffer memory 8 with the tape reproduction control information.

Note that the non-output information that is the program reproduced by the DTR 9 from the magnetic tape may be stored in the buffer memory 8 within the overlapping time of the program reproduced by said HDD 11 and the program reproduced by the DTR 9 or, alternatively, during the idle time produced as a result of the operation of the DTR 9 of reproducing the program from the magnetic tape at a rate higher than that of transferring the information fed by the buffer memory 8 to the time stamp detecting section 12. Still alternatively, the non-output information that is the program reproduced by the DTR 9 from the magnetic tape may be stored in the buffer memory 8 during the idle time produced as a result of delaying the start of the operation reproducing it from the magnetic tape by the time necessary for reading it out from the magnetic tape or delaying the start of the operation of searching the magnetic tape by the DTR 9.

Note that the search for the specified program on the magnetic tape is conducted during the operation of reproducing the access information in order to obtain the post-access information after the access information if the specified program is reproduced for the first time and during the operation of reproducing the non-output information of the program in order to obtain the post-access information after the suspension of the last reproduction if the specified program has been reproduced for a number of times but not completely yet.

Furthermore, the central control section 2 supplies the synchronization changeover switch section 14 with the control information (hereinafter to be referred to as synchronization changeover control information) for controlling the operation of turning the switch of the synchronization changeover switch section 14 on the basis of the pieces of time stamp information fed from the time stamp detecting section 12 and the time stamp detecting section 13.

More specifically, the central control section 2 determines if the information on the specified program fed from the time stamp detecting section 12 to the synchronization changeover switch section 14 is identical with the information on the specified program fed from the time stamp detecting section 13 to the synchronization changeover switch section 14 or not and, if it is determined that the two pieces of information are identical with each other, it supplies the synchronization changeover switch section 14 with the synchronization changeover control information for seamlessly changing over the pieces of information on the specified program that are supplied to the input/output information changeover switch section 6.

For instance, the central control section 2 firstly supplies the synchronization changeover switch section 14 with the changeover control information necessary for turning the switch to the terminal 14b at the side of the time stamp detecting section 13 in order to supply the input/output information changeover switch section 6 with the disk-reproduced specified program received from the time stamp detecting section 13 that is fed with the disk-reproduced specified program from the HDD 11 that is accessible at high speed. Then, the synchronization changeover switch section 14 turns the switch to the terminal 14b according to the supplied changeover control information. Then, the synchronization changeover switch section 14 keeps on supplying the input/output information changeover switch section 6 with the disk-reproduced specified program fed from the time stamp detecting section 13.

Then, the central control section 2 determines if the tape-reproduced specified program and the disk-reproduced specified program fed respectively from the time stamp detecting section 12 and the time stamp detecting section 13 are synchronized or not and hence if the pieces of information fed to the synchronization changeover switch section 14 are identical with each other or not on the basis of the pieces of time stamp information fed respectively from the time stamp detecting section 12 and the time stamp detecting section 13. If the central control section 2 determines that the pieces of information are identical with each other, it supplies the synchronization changeover switch section 14 with the synchronization changeover control information for turning the switch to the terminal 14a at the side of the time stamp detecting section 12 in order to seamlessly change over the pieces of information that are supplied to the input/output information changeover switch section 6 from the synchronization changeover switch section 14.

Furthermore, the central control section 2 supplies the buffer memory 8 and the DTR 9 with the control information (hereinafter to be referred to as time and date sequential recording control information) necessary for causing the operation of recording the programs fed to DTR 9 from the buffer memory 8 to proceed from the top position of the magnetic tape on a time and date sequential basis. Since the buffer memory 8 is a FIFO (first-in first-out) memory as will be described hereinafter, the DTR 9 records the programs fed from the buffer memory 8 from the top position of the magnetic tape on a time and date sequential basis according to the time and date sequential recording control information fed from the central control section 2. Then, after recording the programs fed from the buffer memory 8 down to the tail position of the magnetic tape, the DTR 9 rewinds the magnetic tape to the top position of the magnetic tape and continues the operation of recording the programs once again from the top position. The central control section 2 determines if the magnetic tape sill has the storage capacity for recording the newly supplied programs or not. Additionally, the central control section 2 detects one or more than one programs having the oldest time and date of recording out of the plurality of programs recorded on the magnetic tape.

If the operation of recording programs from the top position of the magnetic tape is not for the first time, the central control section 2 determines that the magnetic tape does not have any storage capacity for recording the newly fed program(s) and causes the DTR 9 to record the newly fed program(s) by erasing the programs recorded at the last time or recording the newly fed program(s) on the programs recorded at the last time for the purpose of updating. At the same time, the access information and the non-output information for the corresponding program(s) on the HDD 11 are recorded by erasing the old ones or in an overlaying manner for the purpose of updating. Thereafter, the central control section 2 constantly detects the program(s) with the oldest time and date out of the number of programs recorded on the magnetic tape and causes the DTR 9 to record the newest program(s) on the recording area of the magnetic tape storing the program(s) with the oldest time and date for the purpose of updating. At the same time, it erases the access information and the non-output information corresponding to the program(s) with the oldest time and date stored on the HDD 11. As a result of doing this, the programs to be recorded on the magnetic tape are prevented from being fragmented and it is possible to simplify the recording algorithm by taking the operation by the DTR 9 of searching for the intended position on the magnetic tape and the buffer memories 8 and 10 into consideration. Additionally, the user is required only to specify the programs to be recorded and relieved of the operation of selecting the information to be erased.

However, if the program(s) with the oldest time and date are simply erased, the non-output program(s) and the program(s) recorded there for the purpose of storage can be randomly erased. Therefore, the central control section 2 causes the program(s) that will be erased next time to be displayed on a display screen (not shown). With this arrangement, if the user wants, he or she can reproduce the program(s) that are to be erased and store them on some other recording medium such as a magnetic disk before they are actually erased. Additionally, as the central control section 2 causes the programs that will be erased next time to be displayed on a display screen (not shown) with priority, the user is allowed to take time for considering about storage of programs. The information concerning the programs to be erased next time may include the time and date of recording and the history of reproduction of each of the programs as well as user's comment on any of the programs.

The data input/output section 3 supplies the externally input data to the terminal 6a of the input/output information changeover switch section 6. Additionally, the data input/output section 3 externally outputs the data fed from the terminal 6a by way of the switch of the input/output information changeover switch section 6.

The AV signal input/output section 4 supplies the externally input AV signal to the encoder/decoder section 5. Additionally, the AV signal input/output section 4 externally outputs the AV signal fed from the terminal 6b of the input/output information changeover switch section 6 by way of the encoder/decoder section 5.

The encoder/decoder section 5 comprises an encoder adapted to transform the AV signal fed from the AV signal input/output section 4 to make it show the format good for recording and supplies the transformed AV signal to the terminal 6b of the input/output information changeover switch section 6 and a decoder adapted to be fed with the AV signal representing the reproduced information reproduced by the DTR 9 or the HDD 11 by way of the switch of the input/output information changeover switch section 6, transform the supplied AV signal to make it good for being externally output and supply the transformed AV signal to the AV signal input/output section 4.

More specifically, the encoder compresses the video signal and the audio signal fed from the AV signal input/output section 4 and supplies the terminal 6b of the input/output information changeover switch section 6 with the video signal and the audio signal that are compressed. The decoder, on the other hand, is fed with the AV signal representing the reproduced information reproduced by the DTR 9 or the HDD 11 from the terminal 6b by way of the switch of the input/output information changeover switch section 6 and divides the AV signal supplied to it into a video signal and an audio signal. Then, the decoder expands the video signal and the audio signal that are separated from each other and supplies the video signal and the audio signal that are expanded to the AV signal input/output section 4.

The input/output information changeover switch section 6 turns the switch either to the terminal 6a or the terminal 6b depending on the information changeover control information fed from the central control section 2.

More specifically, the input/output information changeover switch section 6 turns the switch to the terminal 6a according to the information changeover control information fed from the central control section 2 if it is fed with data from the data input/output section 3, whereas it turns the switch to the terminal 6b according to the information changeover control information fed from the central control section 2 if it is fed with an AV signal from the AV signal input/output section 4 by way of the encoder/decoder section 5.

The time stamp adding section 7 adds the time stamp information showing the absolute time relative to the reference time fed from a timer unit (not shown) to the program fed from the input/output information changeover switch section 6. The arrival time of the packet data of the reproduced information is necessary when decoding the information (hereinafter to be referred to as reproduced information) reproduced by the DTR 9 or the HDD 11 but the reproduced information may contain fluctuations of the time axis typically attributable to uneven running of the magnetic tape. Thus, the operation by the time stamp adding section 7 of adding the time stamp information to the program fed from the input/output information changeover switch section 6 is used in order to prevent the reproduced information from giving rise to a laterally hobbling image and/or fluctuations in the chromaticity of the image on the monitor screen. In other words, the time axis can be corrected by adding the time stamp information to the information fed from the input/output information changeover switch section 6. Therefore, the image and the sound can be reproduced without lateral hobbling and/or fluctuations in the chromaticity of the image when each packet data is reproduced in agreement with the proper arrival time by referring to the time stamp information at the time of decoding.

Note that either the absolute time indicated by a timer unit (not shown) or the relative time from a specific time may be used as time stamp information. Alternatively, the time interval from the arrival time of the immediately preceding packet data may be used as time stamp information. In any case, the arrival time of the packet data in the reproducing operation can be restored without difficulty.

The buffer memory 8 is a FIFO (first-in first-out) memory dedicated to a tape recorder such as DTR and adapted to temporarily store the program including the time stamp information fed from the time stamp adding section 7. Upon receiving the tape recording control information from the central control section 2, the buffer memory 8 supplies the DTR 9 with the program it stores according to the tape recording control information fed to it.

Additionally, upon receiving from the DTR 9 the tape-reproduced specified program that is reproduced from the magnetic tape by the DTR 9, the buffer memory 8 temporarily stores the tape-reproduced specified program supplied to it. Then, upon receiving the tape reproduction control information for supplying the tape-reproduced specified program it stores from the central control section 2, the buffer memory 8 supplies the time stamp detecting section 12 with the tape-reproduced specified program according to the tape reproduction control information supplied to it.

As the buffer memory 8 temporarily stores the program including the time stamp information supplied by the time stamp adding section 7, it is possible to make the DTR 9 record the program as corrected for the time axis. Additionally, as the buffer memory 8 temporarily stores the tape-reproduced specified program reproduced by the DTR 9 from the magnetic tape and supplied from the DTR 9, it is possible to supply the time stamp detecting section 12 with the tape-reproduced specified program after correcting it for the time axis.

The DTR 9 is a tape recording apparatus typically conforming to the D-VHS Standards and is adapted to record the program supplied form the buffer memory 8 on a magnetic tape and reproduce information from the magnetic tape to supply the buffer memory 8 with the tape-reproduced specified program.

More specifically, the DTR 9 is fed with a program including time stamp information from the buffer memory 8 according to the tape recording control information from the central control section 2 and records the program on the magnetic tape. Additionally, the DTR 9 supplies the buffer memory 8 with the tape-reproduced specified program as reproduced from the magnetic tape according to the tape recording control information from the central control section 2.

Note that the DTR 9 stores all the programs fed from the time stamp adding section 7 by way of the buffer memory 8 on the magnetic tape. However, it may alternatively be so arranged that the DTR 9 stores not all the programs fed from the time stamp adding section 7 by way of the buffer memory 8 on the magnetic tape but only those except the top portion reproduced by the HDD 11.

In the case where the DTR 9 conforms to the D-VHS Standards, it records and reproduces digital data at the standard rate of 13.8Mbps, using a mechanism similar to a VTR (video tape recorder) conforming to the VHS Standards that obliquely scans the magnetic tape by means of a magnetic head for the purpose of data recording/reproduction. The magnetic tape as used here has a recording capacity greater than a magnetic disk so that its cost per unit data quantity is lower than that of a magnetic disk, although it requires a longer access time.

The buffer memory 10 is a FIFO (first-in first-out) memory dedicated to a disk drive such as HDD and adapted to temporarily store the program including the time stamp information fed from the time stamp adding section 7. Upon receiving the disk recording control information from the central control section 2, the buffer memory 10 supplies the HDD 11 with the program it stores according to the disk recording control information fed to it.

Additionally, upon receiving from the HDD 11 the disk-reproduced specified program that is reproduced from the magnetic disk by the HDD 11, the buffer memory 10 temporarily stores the disk-reproduced specified program supplied to it. Then, upon receiving the disk reproduction control information for supplying the disk-reproduced specified program it stores from the central control section 2, the buffer memory 10 supplies the time stamp detecting section 13 with the tape-reproduced specified program according to the tape reproduction control information supplied to it.

As the buffer memory 10 temporarily stores the program including the time stamp information supplied by the time stamp adding section 7, it is possible to make the HDD 11 record the program as corrected for the time axis. Additionally, as the buffer memory 10 temporarily stores the disk-reproduced specified program reproduced by the HDD 11 from the magnetic disk and supplied from the HDD 11, it is possible to supply the time stamp detecting section 13 with the disk-reproduced specified program after correcting it for the time axis.

The HDD 11 is typically adapted to access an appropriately selected storage area of a recording medium such as a magnetic disk that can be randomly accessed and record information on or reproduce information from the appropriately selected storage area.

More specifically, the HDD 11 is fed with a program including time stamp information from the buffer memory 10 according to the disk recording control information from the central control section 2 and records the program on the magnetic disk. Additionally, the HDD 11 supplies the buffer memory 10 with the disk-reproduced specified program as reproduced from the magnetic disk according to the disk recording control information from the central control section 2.

Note that the HDD 11 stores the reproduction information of a top portion of each program reproduced from the magnetic tape by the DTR 9 on the magnetic disk in advance b way of the buffer memory 8 and the buffer memory 10. However, it may be so arranged that the HDD 11 records on the magnetic disk in advance the reproduction information of a top portion each program that is not reproduced from the magnetic tape by the DTR 9 but directly fed from the time stamp adding section 7.

Upon receiving the tape-reproduced specified program reproduced from the magnetic tape by the DTR 9, the time stamp detecting section 12 detects the time stamp information contained in the tape-reproduced specified program supplied to it and feed the detected time stamp information to the central control section 2.

Additionally, upon receiving the disk-reproduced specified program reproduced from the magnetic disk by the HDD 11, the time stamp detecting section 13 detects the time stamp information contained in the disk-reproduced specified program supplied to it and feed the detected time stamp information to the central control section 2.

The synchronization changeover switch section 14 operates the switch so as to the images and the sounds obtained from the reproduced information reproduced by the DTR 9 and the HDD 11 may be linked seamlessly according to the synchronization changeover control information fed to it from the central control section 2.

More specifically, if the changeover control information fed from the central control section 2 is that of turning the switch to the terminal 14b in order to supply the input/output information changeover switch section 6 with the disk-reproduced specified program fed from the time stamp detecting section 13, the synchronization changeover switch section 14 turns the switch to the terminal 14b according to the changeover control information fed to it. Then, the synchronization changeover switch section 14 keeps on supplying the input/output information changeover switch section-6 with the disk-reproduced specified program fed from the time stamp detecting section 13 until it receives the next synchronization changeover control information.

If, on the other hand, the synchronization changeover control information fed from the central control section 2 is that of turning the switch to the terminal 14a in order to make the reproduced information fed to the input/output information changeover switch section 6 to be seamlessly switched, the synchronization changeover switch section 14 turns the switch to the terminal 14a according to the synchronization changeover control information fed to it.

In the recording/reproduction apparatus 1 having the above described configuration, the central control section 2 causes the DTR 9 to record the program fed from the buffer memory 8 on the magnetic tape from the top position on a time and date sequential basis by supplying the DTR 9 with the time and date sequential recording control information. In the case where the magnetic tape has no storage area for recording the new program fed to the DTR 9, the central control section 2 causes the DTR 9 to record the new program fed to it in the recording area that stores one or more than one programs with the oldest time and date among all the programs stored on the magnetic tape and is not specified for prohibition of erasure.

With the above described arrangement, the operation on the part of the user is greatly alleviated particularly in terms of key input actions that the user is required to do.

Figure 2:
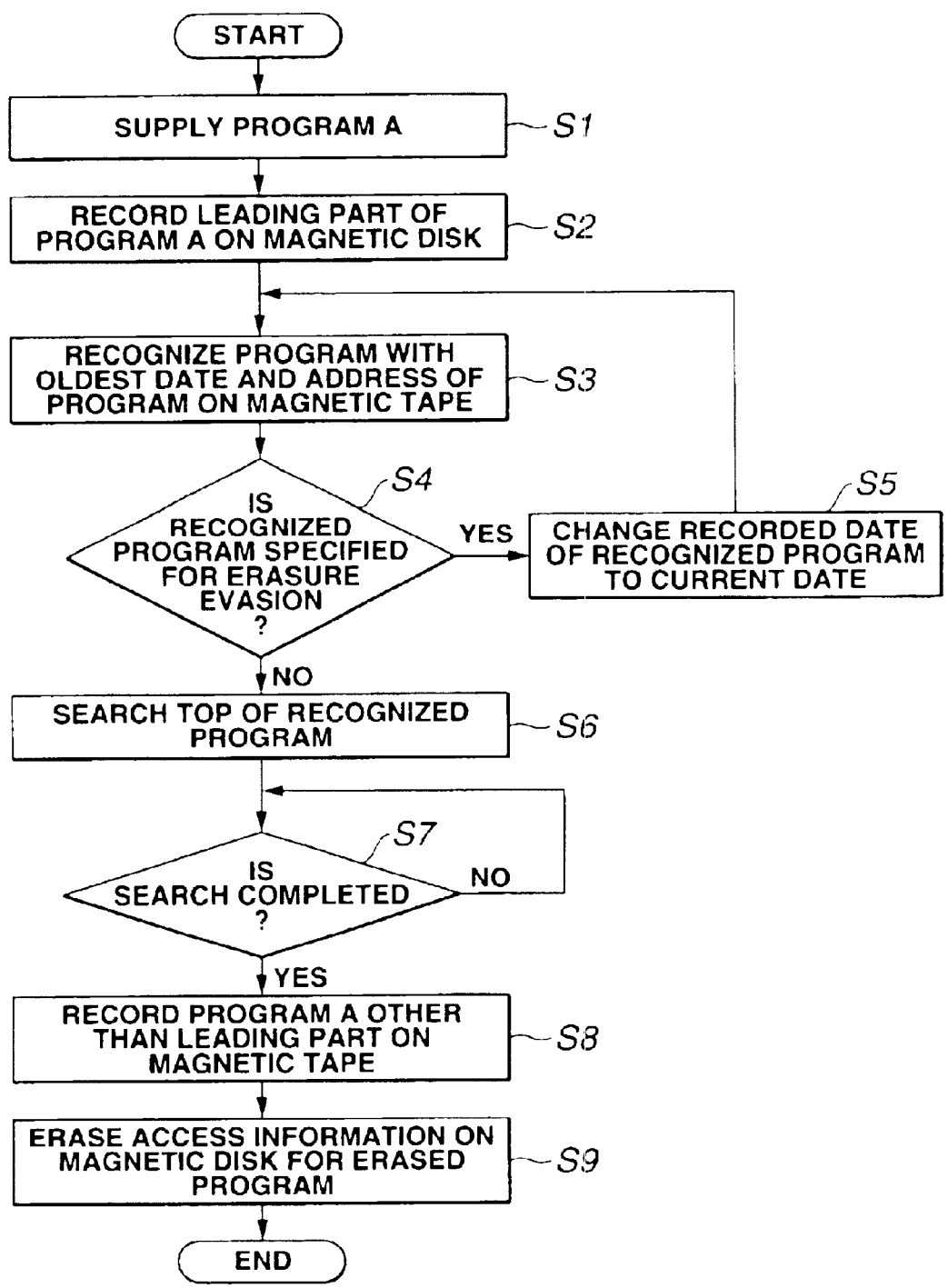
FIG. 2 is a flowchart of the operation of skipping the programs prohibited from being erased when recording the programs supplied to a recording/reproduction apparatus according to the invention on a magnetic tape of DTR in the order of time and date of recording.

Now, the processing operation of recording the programs supplied to the recording/reproduction apparatus 1 on the magnetic tape of the DTR 9 sequentially in terms of time and date will be discussed by referring FIG. 2.

Firstly, in Step S1, upon recognizing that a new program, or program A, is supplied to the buffer memory 8 and the buffer memory 10 from the time stamp adding section 7, the central control section 2 causes the buffer memory 10 to supply the HDD 11 with the access information of the program A.

Then, in Step S2, the HDD 11 records the access information of the program A fed from the buffer memory 10 on the magnetic disk.

In the next step, or Step S3, the central control section 2 detects the program with the oldest time and date of recording out of the plurality of programs stored on the magnetic tape and recognizes the address of the detected program on the magnetic tape.

Then, in Step S4, the central control section 2 determines if the program with the oldest time and date of recording is specified for avoidance of erasure or not. If the program is specified for avoidance of erasure, the central control section 2 changes the time and date of recording of the detected program to the current time and date and returns to Step S3 (Step S5).

If, on the other hand, it is determined in Step S4 that the program detected in Step S3 is not specified for avoidance of erasure, the central control section 2 so controls the DTR 9 as to have its magnetic head search for the top position of the program detected in Step S3 (Step S6).

Then, when the magnetic head is placed at the top position of the program by the DTR 2 and the search is completed (Step S7), the central control section 2 so controls the DTR 9 as to have it record the part of the program A supplied in Step S1 other than the top portion thereof on the magnetic tape (Step S8).

Then, the access information stored on the magnetic disk of the program erased in Step S8 is erased by the HDD 11 (Step S9).

As a result, the recording/reproduction apparatus 1 judges that the program with the oldest time and date of recording is specified for avoidance of erasure in Step S4 because the program is to be erased but specified for avoidance of erasure and changes the time and date of recording of the program specified for avoidance of erasure to make it carry the current time and date of recording so that the program becomes the one to be erased last. In other words, with this recording/reproduction apparatus 1, a program can temporarily avoid erasure when it is specified for avoidance of erasure.

Thus, the program specified for avoidance of erasure by the recording/reproduction apparatus 1 becomes a candidate for erasure only when a cycle of operation of erasing programs in order to record new programs on the magnetic tape is completed and the updated time and date of recording of the program is once again recognized as oldest.

It is so arranged that the recording/reproduction apparatus 1 can consecutively designate programs with the oldest time and date for avoidance of erasure and the designation is realized when the central control section 2 sends a signal for it to the DTR 9. In other words, when programs are specified for avoidance of recording in order to continuously record programs on the magnetic tape in the order of time and date, only a predetermined continuous storage area from the position where the next recording operation is expected to start can be specified.

As a result, the recording/reproduction apparatus 1 can prevent of the next storage area by randomly selecting a point for avoidance of recording.

While the DTR 9 is a main storage unit having a magnetic tape in the above description, the DTR 9 may be replaced by an optical disk recording unit having a plurality of optical disk and an exchanger mechanism for exchanging the plurality of optical disk. The use of an optical disk recording unit can also improve the access rate including the exchange of optical disks by way of the above described processing operation.

Now, the processing operation of recording the supplied programs on an optical disk of the above optical disk recording unit sequentially in terms of time and date of recording will be described by referring to FIG. 3. Note that the optical disk recording unit requires an access time longer than that of the HDD 11 using a magnetic disk.

Figure 3:
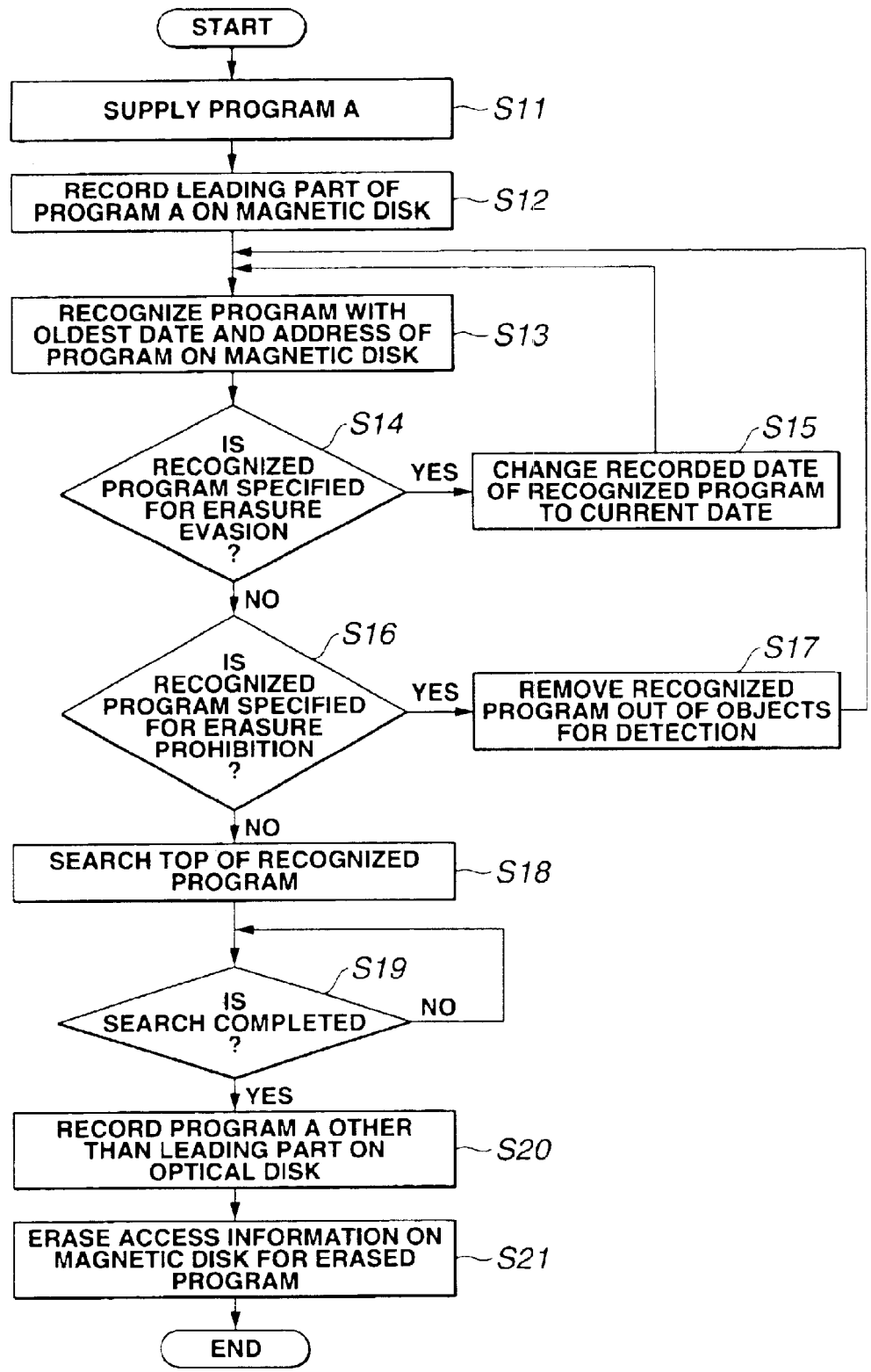
FIG. 3 is a flowchart of the operation of skipping the programs prohibited from being erased and excluding the programs prohibited from being erased from the objects of detection when recording the programs supplied to a recording/reproduction apparatus according to the invention on an optical disk of an optical disk recording apparatus in the order of time and date of recording.

Referring to FIG. 3, upon recognizing that a new program, or program A, is supplied to the buffer memory 8 and the buffer memory 10 from the time stamp adding section 7, the central control section 2 firstly causes the buffer memory 10 to supply the HDD 11 with the access information of the program A in Step S11.

Then, in the next step, or Step S12, the HDD 11 records the access information of the program A fed from the buffer memory 10 on the magnetic disk.

Then, in Step S13, the central control section 2 detects the program with the oldest time and data out of the plurality of programs stored in the optical disk of the optical disk recording unit and recognizes the address of the detected program on the optical disk.

Then, in Step S14, the central control section 2 determines if the program with the oldest time and date is specified for avoidance of erasure or not. If the program is specified for avoidance of erasure, the central control section 2 changes the time and date of recording of the program detected in Step S13 to the current time and date and returns to Step S13 (Step S15).

If, on the other hand, it is determined in Step S14 that the program detected in Step S13 is not specified for avoidance of erasure, the central control section 2 determines if the program detected in Step S13 is specified for prohibition or erasure or not (Step S16) and if it is determined that the program is specified for prohibition of erasure, the central control section 2 excludes the program detected in Step S13 from the objects of detection and returns to Step S13 (Step S17).

If, on the other hand, it is determined in Step S16 that the program detected in Step S13 is specified for prohibition of erasure, the central control section 2 so controls the optical disk recording unit as to have its optical pickup search for the top position of the program detected in Step S13 (Step S18).

Then, when the optical pickup is placed at the top position of the program by the optical disk recording unit and the search is completed (Step S19), the central control section 2 so controls the optical disk recording unit as to have it record the part of the program A supplied in Step S11 other than the top portion thereof on the optical disk (Step S20).

Then, the access information stored on the magnetic disk of the program erased in Step S20 is erased by the HDD 11 (Step S21).

As a result, with the recording/reproduction apparatus comprising the central control section 2 that operates in a manner as described above and the main storage unit that is changed from the DTR 9 to the optical disk recording unit, the recording/reproduction apparatus 1 judges that the program with the oldest time and date of recording is specified for prohibition of erasure in Step S14 because the program is to be erased but specified for prohibition of erasure and changes the time and date of recording of the program specified for prohibition erasure to make it carry the current time and date of recording so that the program becomes the one to be erased last. In other words, with this recording/reproduction apparatus 1, a program can temporarily avoid erasure when it is specified for prohibition of erasure.

Additionally, with the above described recording/reproduction apparatus 1, the program recorded on the optical disk of the optical disk recording unit with the oldest time and date of recording is excluded from the objects of detection is the program is specified for prohibition of erasure so that the program with the oldest time and date is prevented from being erased by a new program.

If compared with the supply of a program to a magnetic tape for recording, the recording of a program on an optical disk provides an advantage of searching for (and changing) the position for recording/reproducing the program on the optical disk at high speed. In other words, the recording of a program on an optical disk can tolerate of the storage area to a certain extent. Therefore, any programs including those specified for prohibition of erasure may be specified for avoidance of erasure regardless of the time and date of recording.

More specifically, with a recording/reproduction apparatus 1 adapted to in record programs on an optical disk, the position for recording/reproducing a program can be searched for at high speed so that a program may be specified not only for temporary avoidance of recording but also for permanent prohibition of erasure. In other words, a program designated for prohibition of erasure remains to be prohibited against erasure until the designation is cancelled by the user. The central control section 2 can sequentially erase programs that are not specified for prohibition of erasure in the order of time and date of recording in order to record newly supplied programs.

While the central control section 2 determines if there is a program specified for avoidance of erasure and one specified for prohibition of erasure in the processing operation of FIG. 3, it may alternatively be so arranged that the central control section 2 selectively determines if there is a program specified for avoidance or erasure or one specified for prohibition of erasure.

Now, the processing operation of copying one or more than one programs on the magnetic disk of the HDD 11 that is conducted when one or more than one programs stored on the magnetic tape are specified for prohibition of erasure will be discussed below by referring to FIGS. 4 and 5. Note that, in the processing operation of FIGS. 4 and 5, programs are erased in the order of time and date of recording and newly supplied programs are recorded on both the magnetic tape and the magnetic disk.

Figure 4:
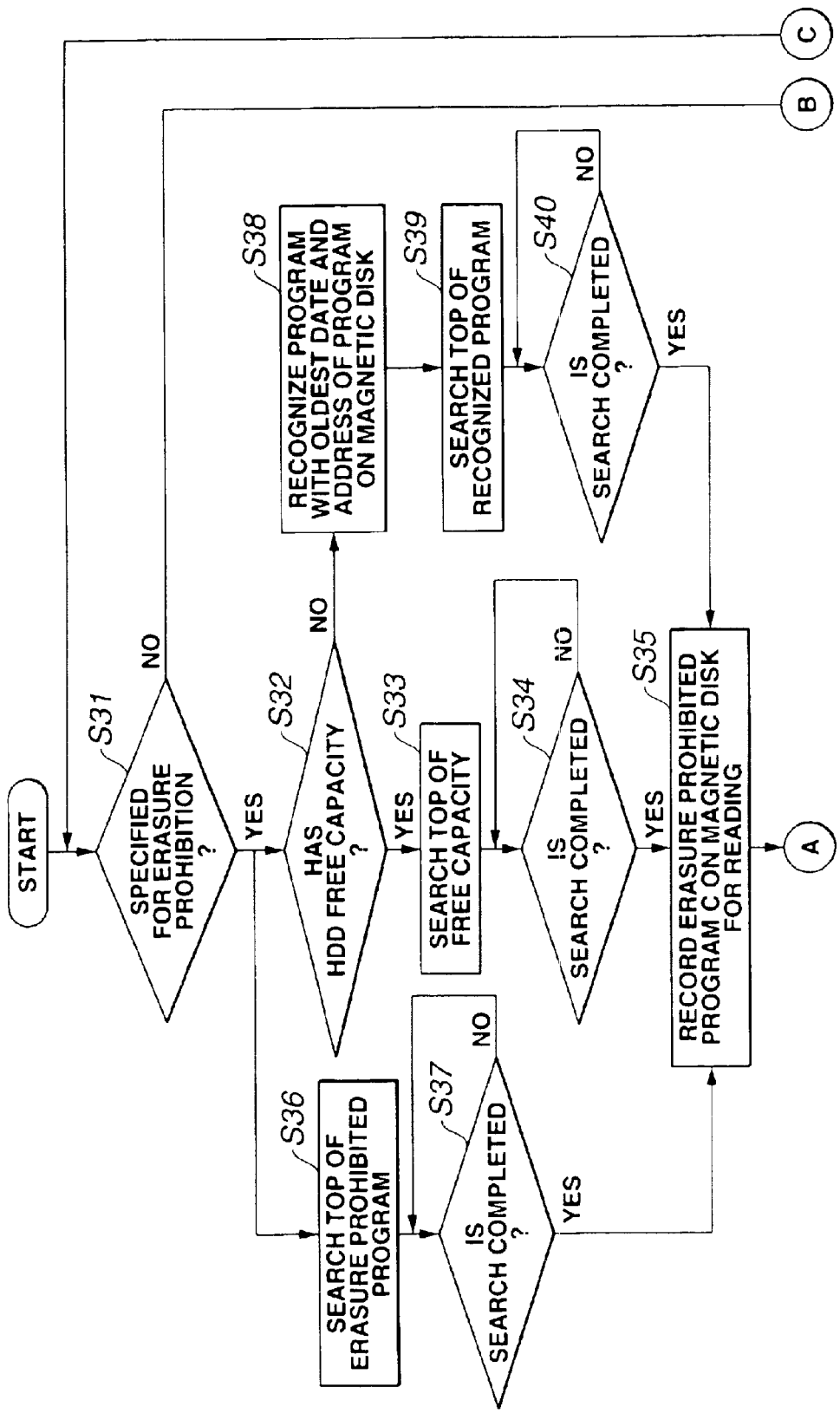
FIG. 4 is a flowchart of the operation of copying the programs recorded on the magnetic tape of DTR on a magnetic disk of HDD conducted when the programs are prohibited from being erased by means of a recording/reproduction apparatus according to the invention.
Figure 5:
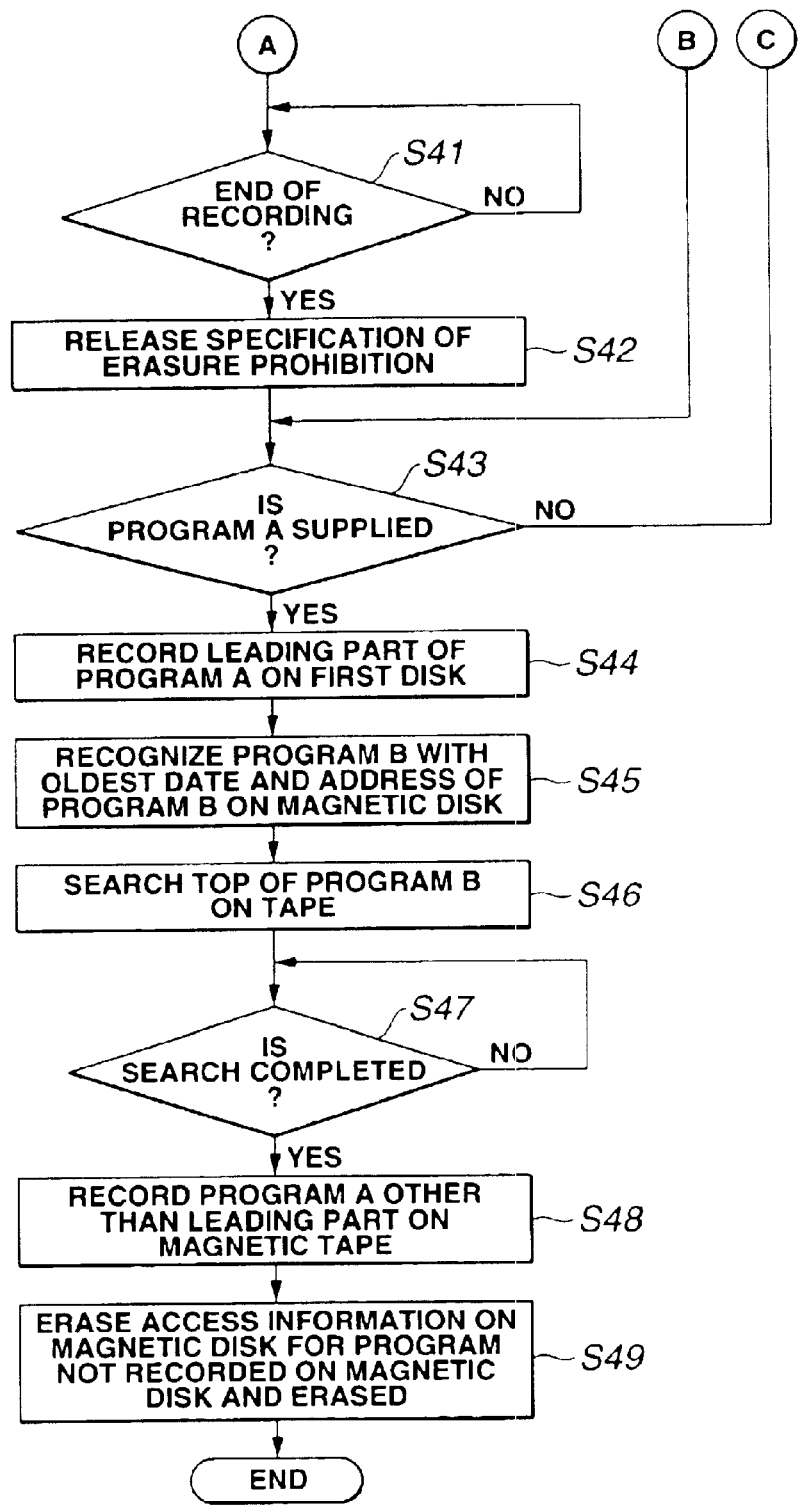
FIG. 5 is another flowchart of the operation of copying the programs recorded on the magnetic tape of DTR on a magnetic disk of HDD conducted when the programs are prohibited from being erased by means of a recording/reproduction apparatus according to the invention.

Referring firstly to FIG. 4, the central control section 2 determines if there is a program specified for prohibition of erasure or not among the programs stored on the magnetic tape (Step S31). If it is determined that there is a program specified for prohibition of erasure, the central control section 2 then determines if the magnetic disk of the HDD 11 has any free storage area that can be used for recording the program specified for prohibition of erasure or not (Step S32). Then, if it is determined that there is not any program specified for prohibition of erasure, the central control section 2 proceeds to Step S43 that is shown in FIG. 5 and will be discussed hereinafter.

If it is determined in Step S31 that there is a program specified for prohibition of erasure, the central control section 2 so controls the DTR 9 as to cause it to search for the top position of the program specified for prohibition of erasure (Step S36) and, when the operation of searching for the top position is over, it proceeds to Step S35 (Step S37).

Additionally, if it is determined in Step S32 that the magnetic disk has a free storage area, the central control section so controls the HDD 11 as to cause it to search for the top position of the free storage area (Step S33) and, if it is determined that the HDD 11 searched out the top position of the free storage area, it proceeds to Step S35 (Step S34).

On the other hand, it is determined in Step S32 that the magnetic tape does not have any free storage area, the central control section 2 recognizes the program wit the oldest time and date of recording in the HDD 11 and the address of the program on the magnetic tape (Step S38) and so controls the HDD 11 as to cause it to search for the recognized address (Step S39). When the search operation is over, it proceeds to Step S35 (Step S40)

In Step S35, the central control section 2 so controls the DTR 9 as to read the program recorded on the magnetic tape and specified for prohibition of erasure and the HDD 11 as to record the program read by the DTR 9. More specifically, the central control section 2 so controls the DTR 9 as to read the program specified for prohibition of erasure from the top position searched for in Step S37 and the HDD 11 as to record the program specified for prohibition of erasure from the address of the free storage area on the magnetic disk searched for in Step S34 or from the address where the program with the oldest time and date is found as a result of the search in Step S40. Then, the central control section 2 proceeds to Step S41 in FIG. 5.

Then, the central control section 2 determines if the operation of recording the program specified for prohibition of erasure is over of not and, if it is determined that the operation is over (Step S41), it operates to cancel the designation of the program stored on the magnetic tape for prohibition of erasure (Step S42).

Then, the central control section determines if the program to be recorded, or program A, is supplied or not (Step S43) and returns to Step S31 if it is determined that the program A is not supplied, whereas it proceeds to if Step S44 if it is determined that the program A is supplied.

Then, in Step S44, the central control section 2 so controls the HDD 11 as to cause it to record the access information of the program A on the recorded and the magnetic disk where the program specified for prohibition of erasure is recorded in Step S35 may be different from each other.

Then, the central control section 2 detects the program with the oldest time and date of recording out of the plurality of programs stored on the magnetic tape and recognizes the address of the detected program on the magnetic tape (Step S45). Then, it so controls the DTR 9 as to cause it to search for the recognized address (Step S46) and, when the search operation is over (Step S46), it so controls the DTR 9 as to cause it to record the part of the program A other than the top portion thereof on the magnetic tape (Step S48). Then, the central control section 2 so controls the HDD 11 as to cause it to erase the access information of the program(s) erased without being recorded in Step S35 or Step S48 and terminates the processing operation (Step S49).

Thus, with the recording/reproduction apparatus 1, the programs specified for prohibition of erasure by the user are copied on the magnetic disk from the magnetic tape out of the programs stored on the magnetic tape to cancel the designation of the programs stored on the tape for prohibition of erasure. Thus, any fragmentation of the storage area of the magnetic tape due to a plurality of programs specified for prohibition of erasure on the magnetic tape can be prevented from taking place and hence programs can be recorded continuously on the magnetic tape in the order of time and date of recording.

With the recording/reproduction apparatus 1 as illustrated in FIG. 4, it may be so arranged that the user can select a program stored on the magnetic tape and designated for prohibition of erasure to cancel the designation in view of the fact that the storage capacity of the magnetic tape is not limitless. Alternatively, with the recording/reproduction apparatus 1 of FIG. 4, it may be so arranged that the user is not required to cancel the designation of a programs stored on the magnetic tape for prohibition of erasure and the program stored on the magnetic tape with the oldest time and date of recording is erased first. If such is the case, the time and date of recording of a program specified for prohibition of erasure may be the time and date when the program is copied or when the program is recorded for the first time. With the recording/reproduction apparatus 1 adapted to operate in such a way, the position of recording a newly supplied program on the magnetic disk can be controlled without difficulty.

While the DTR 9 is a main storage unit having a magnetic tape in the above description, the DTR 9 may be replaced by an optical disk recording unit having a plurality of optical disk and an exchanger mechanism for exchanging the plurality of optical disk. The use of an optical disk recording unit can also improve the access rate including the exchange of optical disks by way of the above described processing operation.

Now, the processing operation of copying a program recorded on the magnetic tape onto the magnetic disk and record the copied program as the most recent program on the magnetic tape will be discussed below by referring to FIGS. 6 and 7.

Figure 6:
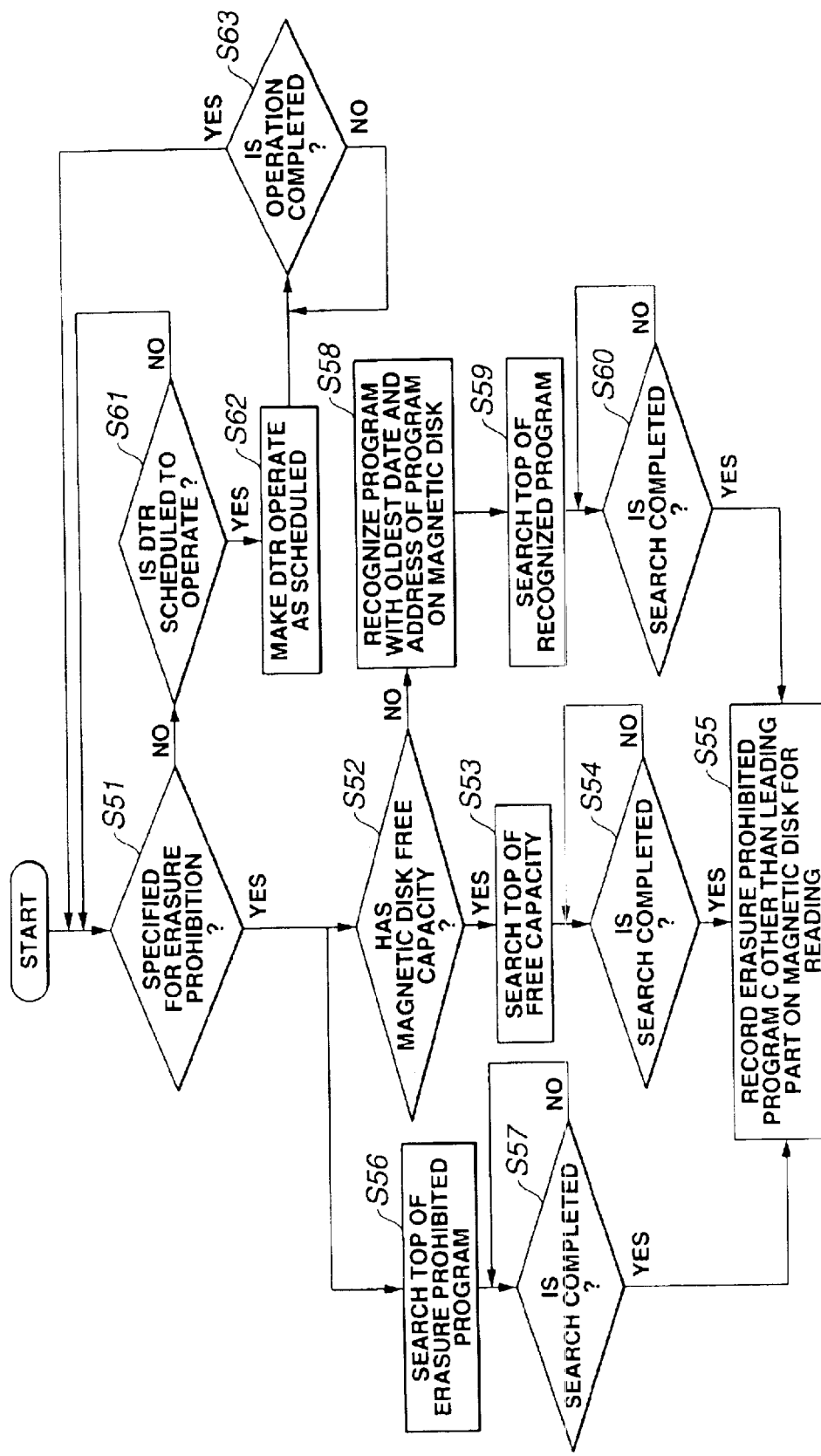
FIG. 6 is a flowchart of the operation of copying the programs recorded on a magnetic tape on a magnetic disk and recording the copied programs on the magnetic tape as newest programs by means of a recording/reproduction according to the invention.
Figure 7:
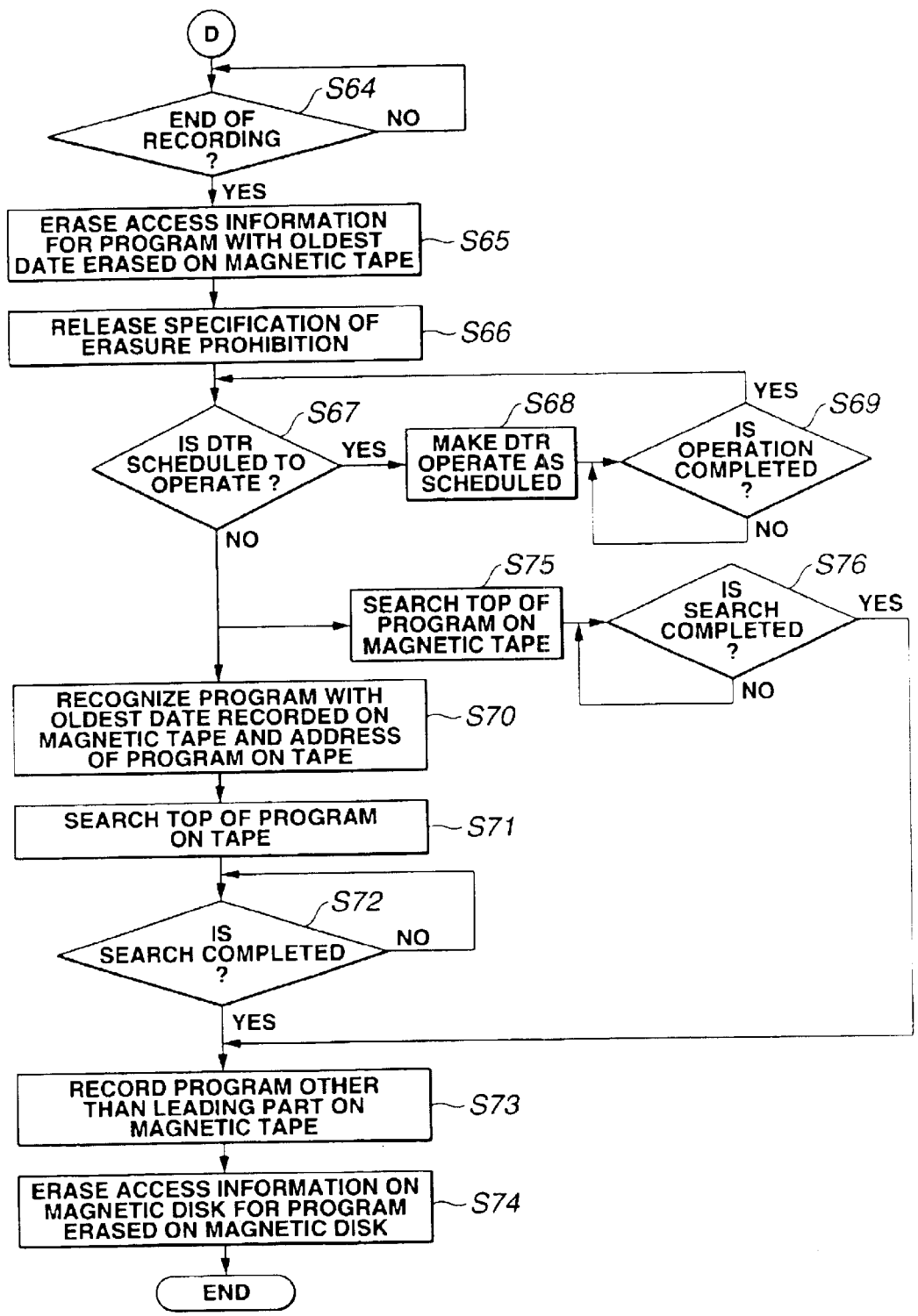
FIG. 7 is another flowchart of the operation of copying the programs recorded on a magnetic tape on a magnetic disk and recording the copied programs on the magnetic tape as newest programs by means of a recording/reproduction according to the invention.

Referring to FIG. 6, firstly, the central control section 2 determines if there is a program specified for prohibition of erasure among the programs stored on the magnetic tape or not (Step S51). If it is determined that there is not any program specified for prohibition of erasure, the central control section 2 determines if the DTR 9 has any scheduled operation or not (Step S61) and then returns to Step 51 when it is determined that the DTR 9 does not have any scheduled operation. However, if it determined that the DTR 9 has a scheduled operation, the central control section 2 so controls the DTR so as to cause it to carry out the scheduled operation (Step S62) and then returns to Step S51 when it is determined that the scheduled operation is carried out (Step S63). In short, the central control section 2 operates for copying a processing recorded on the magnetic disk onto the magnetic tape when there is no other operation to be carried out.

If it is determined that there is a program specified for prohibition erasure in Step S51, the central control section 2 so controls the DTR 9 as to search for the top position of the processing specified for prohibition of erasure (Step S56)

and, when the operation of searching for the top position of the program is over, it proceeds to Step S55 (Step S57).

Additionally, if it is determined that there is a program specified for prohibition erasure in Step S51, the central control section 2 also determines if the magnetic disk of the HDD 11 has a free storage area for recording the program specified for prohibition of erasure or not (Step S52).

Then, if it is determined in Step S52 that the magnetic disk has a free storage area for recording the program, the central control section 2 so controls the HDD 11 as to cause it to search for the top position of the free storage area (Step S53) and proceeds to Step 555 when it is determined that the top position of the free storage area is found on the magnetic tape of the HDD 11 (Step S54).

On the other hand, if it is determined in Step S52 tha the magnetic disk does not have nay free storage area for recording the program, the central control section 2 recognizes the address of the program with the oldest time and date of recording in the HDD 11 and the address of the program on the magnetic disk (Step S58) and so controls the HDD 11 as to cause it to search for the recognized address (Step S59). When the search is over, the central control section 2 proceeds to Step S55 (Step S60).

In Step S55, the central control section 2 so controls, the DTR 9 as to cause it to read out the part of the program specified for prohibition of erasure and recorded on the magnetic tape other than the top portion thereof and the HDD 11 as to cause it record the read out program on the magnetic disk. More specifically, the central control section 2 so controls the DTR 9 so as to cause it to read out the part of the program specified for prohibition of erasure other than the top portion thereof from the top position found as a result of the search in Step S57 and the HDD 11 as to cause it to record the program prohibited for erasure in the free storage area found as a result of the search in Step S54 or from the address of the program with the oldest time and date of recording found as a result of the search in Step S60. Then, the central control section 2 proceeds to Step S64.

Then, the central control section 2 determines if the operation of recording the program specified for prohibition of erasure is over or not and, if it is determined that the recording operation is over (Step S64), it so controls the HDD 11 as to cause it to erase the access information recognized in Step S58 of the program with the oldest time and date of recording erased in Step S55 (Step S65) and cancel the designation of the program specified for prohibition of erasure and recorded on the magnetic tape (Step S66).

Then, the central control section 2 determines if the DTR 9 has any scheduled operation or not (Step S67) and, if it is determined that the DTR 9 has a scheduled operation, the central control section 2 so controls the DTR 9 as to cause it to carry out the scheduled operation (Step S68) and returns to Step S67 when it is determined that the scheduled operation is over (Step S69).

If, on the other hand, it is determined that the DTR 9 does not have any scheduled operation, it recognizes the address of the program with the oldest time and date of recording on the magnetic tape and the address of the program on the magnetic tape (Step S70) and so controls the DTR 9 as to cause it to search for the recognized address (Step S71). The central control section 2 proceeds to Step S73 when the search is over (Step S72).

Additionally, if it is determined in Step S67 that the DTR 9 does not have any scheduled operation, it so controls the HDD 11 as to cause it to search for the top position of the program copied and recorded in Step S55 (Step S75) and proceeds to Step S73 when it is determined that the search operation is over (Step S76).

In Step S73, the central control section 2 operates for recording the program copied and recorded on the magnetic tape in Step S55 on the magnetic tape with the current time and date and erasing the access information of the oldest program recognized in Step S70 and erased in Step S73 from the magnetic disk to end the overall processing operation.

With the recording/reproduction apparatus 1 adapted to operate in a manner as described above and sequentially record programs on a magnetic tape, if any of the recorded programs that is specified for prohibition of erasure is detected on the magnetic tape, the program is copied immediately on a magnetic disk and the designation of the program for prohibition of erasure is cancelled so that a new program may be recorded on the magnetic tape. More specifically, the recording/reproduction apparatus 1 gives the current time and date to the program recorded on the magnetic tape in Step S73 to maintain the continuity of recording on the magnetic tape and, at the same time, prevent the program specified for prohibition of erasure from being erased inadvertently.

Additionally, with the recording/reproduction apparatus 1, the program stored on the magnetic disk and specified for prohibition of erasure is recorded on the magnetic tape with the current time and date of recording when the magnetic tape is found to have a storage area sufficient for recording the program by way of the steps of Step S61 through S63 and Step S67 through S69.

With this arrangement, the recording/reproduction apparatus 1 can erase the program from the magnetic disk when the program is copied and recorded on the magnetic tape with the current time and date of recording. Therefore, the recording/reproduction apparatus 1 can efficiently utilize the storage capacity of the magnetic disk.

While the DTR 9 is a main storage unit having a magnetic tape in the above description, the DTR 9 may be replaced by an optical disk recording unit having a plurality of optical disk and an exchanger mechanism for exchanging the plurality of optical disk. The use of an optical disk recording unit can also improve the access rate including the exchange of optical disks by way of the above described processing operation.

Additionally, it may be so arranged that the central control section 2 designates a program to be erased as program specified for prohibition of erasure when the user operates the apparatus to specify the program for prohibition of erasure.

Figure 8:
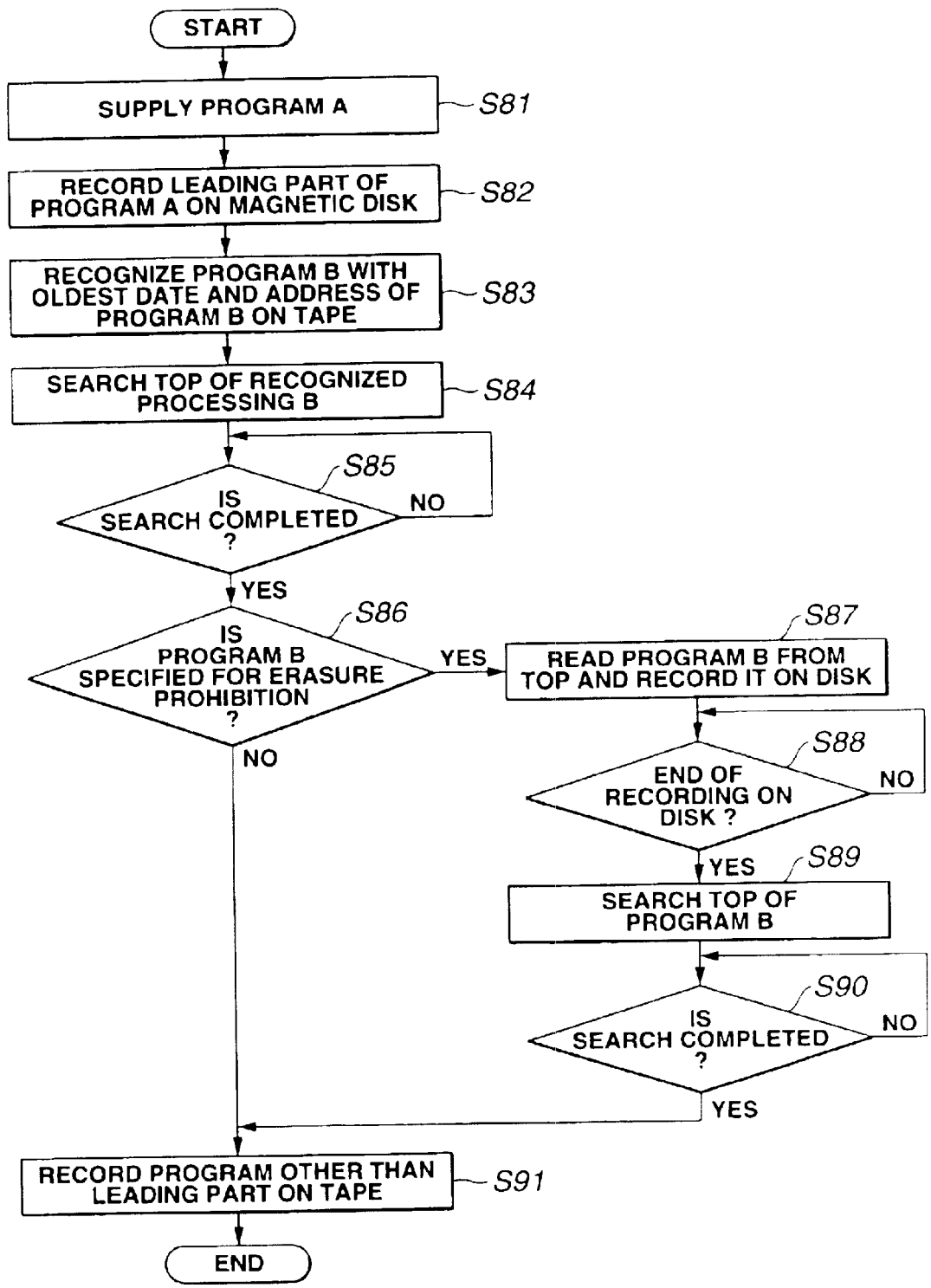
FIG. 8 is a flowchart of the operation from the time when a new program if is supplied from the time stamp adding section to the buffer memory to the time when the program is recorded on a magnetic tape of DTR.

Now, the processing operation from the time when a new program, or program A, is supplied from the time stamp addition section 7 to the buffer memory 8 and the buffer memory 10 to the time when the program A is recorded on the magnetic tape by the DTR 9 of the recording/reproduction apparatus 1 will be discussed by referring to the flowchart of FIG. 8.

Assume here that the magnetic tape does not have any storage area for recording the newly supplied program A and the program with the oldest time and date of recording stored on the magnetic tape is program B.

Firstly, in Step S81, upon recognizing that the new program A is supplied from the time stamp adding section 7 to the buffer memory 8 and the buffer memory 10, the central control section 2 causes the buffer memory 10 to supply the HDD 11 with the access information of the program A.

Then, the central control section 2 so controls the HDD 11 as to cause it to record the access information of the program A fed from the buffer memory 10 on the magnetic disk (Step S82).

Thereafter, the central control section 2 detects the program B with the oldest time and date of recording out of the plurality of programs stored on the magnetic tape and recognizes the address of the detected program B on the magnetic tape (Step S83).

Then, the central control section 2 so controls the DTR 9 as to cause it to search for the top position of the program B having the recognized address on the magnetic tape (Step S83). When the search operation is over (Step S85), the central control section 2 proceeds to Step S86.

Subsequently, the central control section 2 determines if the program B searched for by the DTR 9 is specified for prohibition of erasure or not (Step S86) and proceeds to Step S91 if it is determined that the program B searched for by the DTR 9 is not specified for prohibition of erasure, where it proceeds to Step S87 if it is determined that the program B searched for by the DTR 9 is specified for prohibition of erasure.

Then, the central control section 2 causes the DTR 9 to read out the program B from the top position having the recognized address on the magnetic tape and supply the read out program B to the HDD 11 by way of the buffer memory 8 and the buffer memory 10 and so controls the HDD 11 as to cause it to record the program B fed from the DTR 9 on the magnetic disk (Step S87). The central control section 2 then causes the DTR 9 to searche for the top position of the program B (Step S89) when it is determined that the operation of recording the program B on the magnetic disk is over (Step S88).

Then, the central control section 2 determines if the operation by the DTR 9 of searching for the top position having the recognized address of the program B on the magnetic tape is over or not (Step S90) and, if it is determined that the search operation is over, it proceeds to Step S91.

Subsequently, the central control section 2 causes the DTR 9 to store the post-access information of the program A recorded by the HDD 11 on the magnetic disk on the magnetic tape so that the program A may be reproduced seamlessly with the information reproduced by the HDD 11 from the magnetic disk (Step S91).

As described above, with the recording/reproduction apparatus 1, if a new program is supplied so as to be recorded on the magnetic tape and the magnetic tape does not have any free storage area sufficiently large for storing the program, the storage area of the magnetic tape is not specified for recording the program but the newly supplied program is recorded on the program stored on the magnetic tape with the oldest time and date of recording so that the operation on the part of the user is greatly alleviated particularly in terms of key input actions that the user is required to do.

With the recording/reproduction apparatus 1 according to the invention and having the above described configuration, the operation required to specify a program on the magnetic tape for prohibition of erasure is simplified to improve the efficiency of operation of the user interface.

Additionally, with the recording/reproduction apparatus 1 according to in the invention and having the above described configuration, the recording algorithm is simplified because programs are recorded continuously on the magnetic tape in the order of time and date of recording.

Still additionally, with the recording/reproduction apparatus 1 according to the invention and having the above described configuration, the operation of recording/reproducing programs is simplified because any fragmentation of the storage area of the magnetic tape is prevented from taking place.

Furthermore, with the recording/reproduction apparatus 1 according to the invention and having the above described configuration, the time required to detect the position to be searched for on the magnetic tape is reduced because the operation of recording/reproducing programs is simplified.

Furthermore, with the recording/reproduction apparatus 1 according to the invention and having the above described configuration, the access information of each of the programs stored on the magnetic disk can be partly or entirely replaced by the non-output information on the program so that it may be reproduced during the time when the DTR 9 is waiting for the access. Thus, the recording capacity of the magnetic disk required for the operation of the recording/reproduction apparatus 1 can be reduced significantly.

Furthermore, with the recording/reproduction apparatus 1 according to the invention and having the above described configuration, the reliability of operation is greatly enhanced because the operation by the DTR 9 of searching for a specified program on the magnetic tape and the speed of searching for the program are greatly reduced.

While the DTR 9 is the tape recording/reproduction unit of the above described recording/reproduction apparatus 1, it may replaced by a VTR (video tape recorder), a magnetic tape changer or a magnetic disk changer, a semiconductor memory or an IC memory. Likewise, while the HDD 11 is the disk recording/reproduction unit having a random access feature of the above described recording/reproduction apparatus 1, it may be replaced by a semiconductor memory, an IC memory or a VTR.

Additionally, with the above described recording/reproduction apparatus 1, the intervals of the intermitting recording and/or reproducing operation of the DTR 9 can be maximized by increasing the storage capacity of the buffer memory 8 and/or the buffer 10 or by allowing the buffer memory 8 of the DTR 9 and the buffer memory 10 of the HDD 11 to exchange information so that the buffer memory 10 and the HDD 11 may be used as buffer memory of the DTR 9. This arrangement can minimize the possible damage to the magnetic tape.

Still additionally, the above described recording/reproduction apparatus 1 may be so configured that it comprises only the DTR 9 that is a tape recording/reproduction unit by eliminating the HDD 11 that is a disk recording/reproduction unit.

Still additionally, with the above described recording/reproduction apparatus 1, it may be so arranged that, if a program stored on the magnetic tape and specified by the central control section 2 for prohibition of erasure is found adjacent to the program with the oldest time and date of recording on the magnetic tape, it is erased first in the next recording operation.

Furthermore, with the above described recording/reproduction apparatus 1, it may be so arranged that the time and date when a program on the magnetic tape is specified by the central control section 2 for prohibition of erasure is made to be the time and date when the program is recorded on the magnetic tape.

What is claimed is:

1. A recording/reproduction apparatus comprising:
    a first information recording means for recording information, including information of a time and date of recording on a first recording medium from a recording starting point of said first recording medium in an order of time and date of recording;

a recording capacity determining means for judging if said first recording medium has a remaining recording capacity sufficient for recording said information;

an oldest information detecting means for detecting one or more pieces of information having an oldest time and date of recording out of a plurality of pieces of information recorded on said first recording medium;

a recording control means for controlling an operation of recording information not recorded on said first recording medium in a recording area of said first recording medium and for storing said one or more pieces of information having the oldest time and date of recording as detected by said oldest information detecting means if the information not recorded on said first recording medium is supplied and said recording capacity determining means judges that said recording medium does not have said remaining recording capacity; and an erasure prohibiting means for specifying one or more pieces of information recorded by said first information recording means on said first recording medium for prohibition of erasure;

wherein the oldest time and date of recording of said one or more pieces of information having been specified for the prohibition of erasure by the erasure prohibiting means are changed to have a current time and date of recording when said first recording medium is filled to capacity.

2. The recording/reproduction apparatus according to claim 1, wherein said recording control means is adapted to control said first information recording means so as to cause the recording control means to record the information not recorded on said first recording medium in the recording area on said first recording medium and adapted to store the one or more pieces of recorded information having the oldest time and date of recording except said one or more pieces of recorded information specified by said erasure prohibiting means.

3. The recording/reproduction apparatus according to claim 2, further comprising:

a second information recording means for recording information on a second recording medium; and a specification cancelling means for cancelling a specification of said one or more pieces of recorded information for prohibition of erasure as specified by said erasure prohibiting means;

said recording control means is adapted to control said first information recording means, when a piece of information not recorded on said first recording medium is supplied and when it is determined by said recording capacity determining means that said first recording medium does not have a remaining recording capacity sufficient for recording said information to be recorded, so as to cause said first information recording means to reproduce the one or more pieces of information stored on said recording medium with the oldest time and date of recording as detected by said oldest information detecting means out of the recording area of said first recording medium to be used for recording said information not recorded on said first recording medium and record the reproduced information on said second recording medium; and said specification cancelling means is adapted to cancel the prohibition of erasure of said one or more pieces of recorded information as specified by said erasure prohibiting means after a completion of recording said information reproduced by said second information recording means on said second recording medium.

4. The recording/reproduction apparatus according to claim 1, further comprising:

a second information recording means for recording information on a second recording medium; and a specification cancelling means for cancelling a specification of said one or more pieces of recorded information for prohibition of erasure as specified by said erasure prohibiting means;

said recording control means is adapted to control said first information recording means, when a piece of information not recorded on said first recording medium is supplied and when it is determined by said recording capacity determining means that said first recording medium does not have a remaining recording capacity sufficient for recording said information to be recorded, so as to cause said first information recording means to reproduce the one or more pieces of information stored on said recording medium with the oldest time and date of recording as detected by said oldest information detecting means out of the recording area of said first recording medium to be used for recording said information not recorded on said first recording medium; and said specification cancelling means is adapted to cancel the prohibition of erasure of said one or more pieces of recorded information as specified by said erasure prohibiting means after a completion of recording said information reproduced by said second information recording means on said second recording medium.

5. The recording/reproduction apparatus according to claim 2, further comprising:

a second information recording means for recording information on a second recording medium; and a specification cancelling means for cancelling the specification of said one or more pieces of recorded information for prohibition of erasure as specified by said erasure prohibiting means;

said recording control means is adapted to control said first information recording means, when a piece of information not recorded on said first recording medium is supplied and when it is determined by said recording capacity determining means that said first recording medium does not have a remaining recording capacity sufficient for recording said information to be recorded, so as to cause said first information recording means to reproduce the one or more pieces of information stored on said recording medium with the oldest time and date of recording as detected by said oldest information detecting means out of the recording area of said first recording medium to be used for recording said information not recorded on said first recording medium; and said specification cancelling means is adapted to cancel the prohibition of erasure of said one or more pieces of recorded information as specified by said erasure prohibiting means after a completion of recording said information reproduced by said second information recording means on said second recording medium.

6. The recording/reproduction apparatus according to claim 1, further comprising:

a second information recording means for recording information on a second recording medium; and a specification cancelling means for cancelling the specification of said one or more pieces of recorded information for prohibition of erasure as specified by said erasure prohibiting means;

said recording control means is adapted to control said first information recording means, when a piece of information not recorded on said first recording medium is supplied and when it is determined by said recording capacity determining means that said first recording medium does not have a remaining recording capacity sufficient for recording said information to be recorded, so as to cause said first information recording means to reproduce said one or more pieces of information specified by said erasure prohibiting means and stored on said recording medium out of the recording area of said first recording medium to be used for recording said information not recorded on said first recording medium; and said specification cancelling means is adapted to cancel the prohibition of erasure of said one or more pieces of recorded information as specified by said erasure prohibiting means after a completion of recording said information reproduced by said second information recording means on said second recording medium.

7. The recording/reproduction apparatus according to claim 3, further comprising:

a second recording capacity determining means for judging if said second recording medium has a remaining recording capacity sufficient for recording said information; and a second oldest information detecting means for detecting one or more pieces of information having an oldest time and date of recording out of a plurality of pieces of information recorded on said second recording medium;

said second information recording means is adapted to record said information to be recorded as accompanied by the information on the time and date of recording on said second recording medium in an order of scheduled time and date of recording from a starting point for recording on said second recording medium; and said recording control means is adapted to control said second information recording means, when a piece of information not recorded on said second recording medium is supplied and when it is determined by said second recording capacity determining means that said second recording medium does not have a remaining recording capacity sufficient for recording said information to be recorded, so as to cause said second information recording means to record said information not recorded on said second recording medium in the recording area said second recording medium and to store said one or more pieces of information having the oldest time and date of recording as detected by said second oldest information detecting means.

8. The recording/reproduction apparatus according to claim 5, further comprising:

a second recording capacity determining means forjudging if said second recording medium has a remaining recording capacity sufficient for recording said information; and a second oldest information detecting means for detecting one or more pieces of information having an oldest time and date of recording out of the plurality of pieces of information recorded on said second recording medium;

said second information recording means is adapted to record said information to be recorded as accompanied by the information on the time and date of recording on said second recording medium in an order of scheduled time and date of recording from a starting point for recording on said second recording medium; and said recording control means is adapted to control said second information recording means, when a piece of information not recorded on said second recording medium is supplied and when it is determined by said second recording capacity determining means that said second recording medium does not have a remaining recording capacity sufficient for recording said information to be recorded, so as to cause said second information recording means to record said information not recorded on said second recording medium in the recording area on said second recording medium and to store said one or more pieces of information having the oldest time and date of recording as detected by said second oldest information detecting means.

9. The recording/reproduction apparatus according to claim 7, wherein the time and date when the reproduced information is recorded by said second information recording means on said second recording medium is treated as if the time and date when said information is recorded by said first information recording means on said first recording medium.

10. The recording/reproduction apparatus according to claim 8, wherein the time and date when the reproduced information is recorded by said second information recording means on said second recording medium is treated as if the time and date when said information is recorded by said first information recording means on said first recording medium.

11. The recording/reproduction apparatus according to claim 1, further comprising:

a display section for displaying the one or more pieces of recorded information with the oldest time and date of recording as detected by said oldest information detecting means except said one or more pieces of recorded information specified by said erasure prohibiting means.

12. A recording/reproduction method comprising the steps of:

first recording information to be recorded in a first information recording means, including information of a time and date of recording on a first recording medium from a recording starting point of said first recording medium in an order of time and date of recording;

judging if said first recording medium has a remaining recording capacity sufficient for recording said information;

detecting one or more pieces of information having an oldest time and date of recording out of a plurality of pieces of information recorded on said first recording medium;

second recording of information not recorded on said first recording medium in a recording area of said first recording medium;

storing said one or more pieces of information having the oldest time and date of recording as detected in said detecting step if the information not recorded on said first recording medium is supplied and it is judged in said determining step that said recording medium does not have said remaining recording capacity; and specifying one or more pieces of information recorded by said first information recording means on said first recording medium for prohibition of erasure;

wherein the oldest time and date of recording of said one or more pieces of information having been specified for the prohibition of erasure are changed to have a current time and date of recordings when said first recording medium is filled to capacity.

13. The recording/reproduction method according to claim 12, wherein the information not recorded on said first recording medium is recorded in the recording area on said first recording medium and one or more pieces of recorded information having the oldest time and date of recording except said one or more pieces of recorded information specified in said second recording step are stored.

14. The recording/reproduction method according to claim 12, wherein when a piece of information not recorded on said first recording medium is supplied and when it is determined in said judging step that said first recording medium does not have a remaining recording capacity sufficient for recording said information to be recorded, the one or more pieces of information stored on said recording medium with the oldest time and date of recording as detected in said detecting step are reproduced out of the recording area of said first recording medium to be used for recording said information not recorded on said first recording medium and the reproduced information is recorded on said second recording medium in said second recording step.

* * * * *